United States Patent
Koltuniak et al.

[15] 3,641,419
[45] Feb. 8, 1972

[54] MODULAR POWER SUPPLY WITH PLURAL RECTIFIER HOUSINGS BACK OF WHICH CONTAINS RECTIFYING DEVICES, A TRANSFORMER AND FAN MEANS

[72] Inventors: Michael A. Koltuniak, Warren; Thomas N. Urquhart, Troy, both of Mich.

[73] Assignee: Controlled Power Corporation, Farmington, Mich.

[22] Filed: Feb. 6, 1970

[21] Appl. No.: 9,331

[52] U.S. Cl. ..................................321/8 C, 321/18, 321/27, 321/5
[51] Int. Cl. .......................................................H02m 7/00
[58] Field of Search ..........................321/5, 8, 8 C, 18, 27, 47

[56] References Cited

UNITED STATES PATENTS

| | | | |
|---|---|---|---|
| 2,807,771 | 9/1957 | Winograd | 321/27 X |
| 3,173,061 | 3/1965 | Storsand | 321/8 C |
| 3,241,034 | 3/1966 | Ludwig | 321/8 C |
| 3,390,321 | 6/1968 | Plow | 321/18 X |

*Primary Examiner*—William M. Shoop, Jr.
*Attorney*—Barnes, Kisselle, Raisch & Choate

[57] ABSTRACT

A modular power supply for converting three-phase alternating current to direct current for high kva applications. A plurality of individual rectifying modules are all fed through a common three-phase SCR controller. Each module in turn comprises a delta-wye transformer and a three-phase, full wave diode rectifying circuit. An individual cooling fan is packaged with the transformer and rectifying circuit of each module in a confined package. The transformer in each module is fed from the common SCR controller to an individual circuit breaker associated with each module but separately packaged in the module bank immediately adjacent its associated module. The DC output from each module is collected by a common bussing arrangement and a particular automatic voltage-current regulator is provided to control the duty cycle of the common SCR controller. The modules are arranged in a compact bank by stacking the modules in vertical columns and providing a plurality of columns side by side.

10 Claims, 9 Drawing Figures

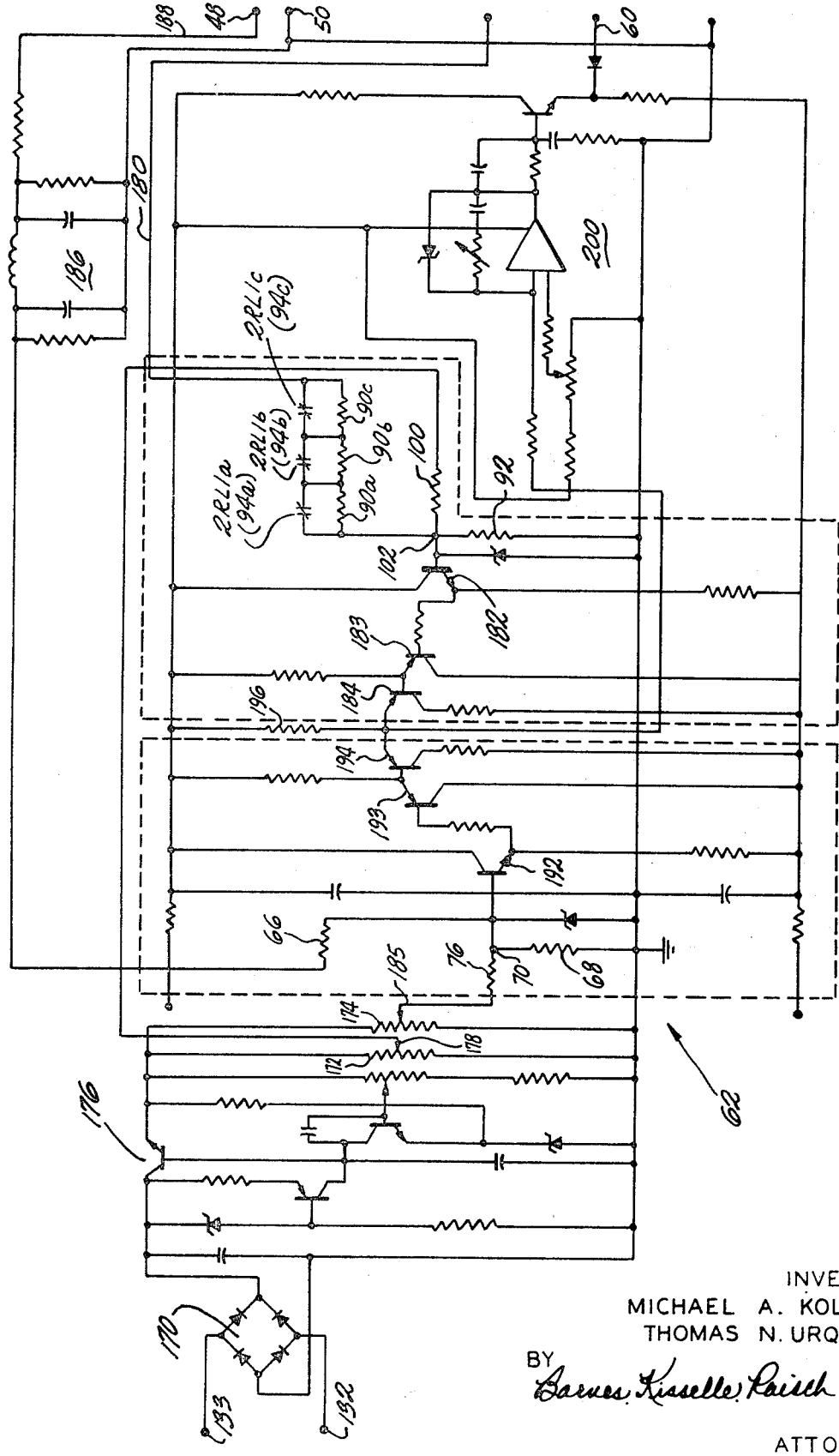

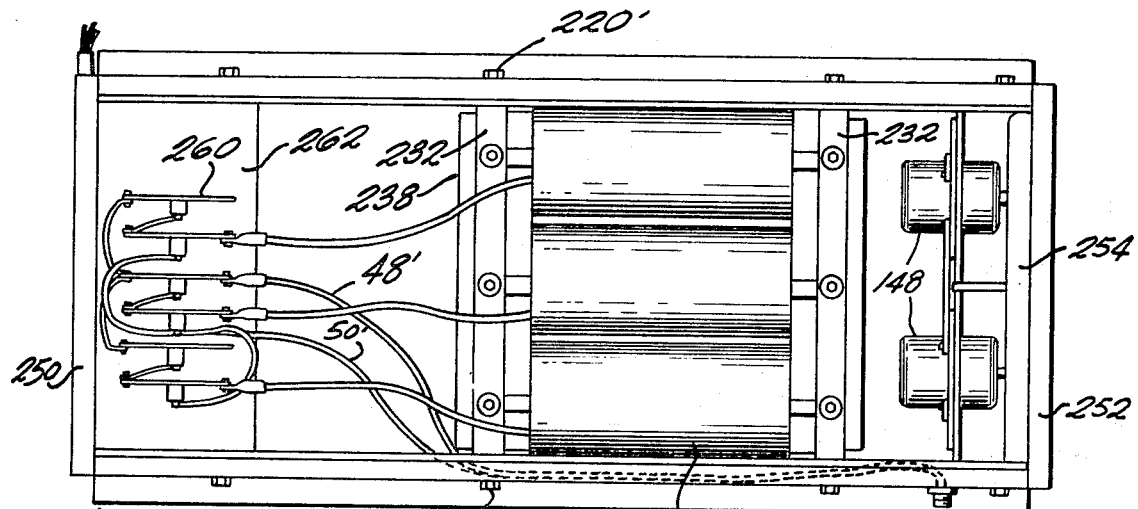
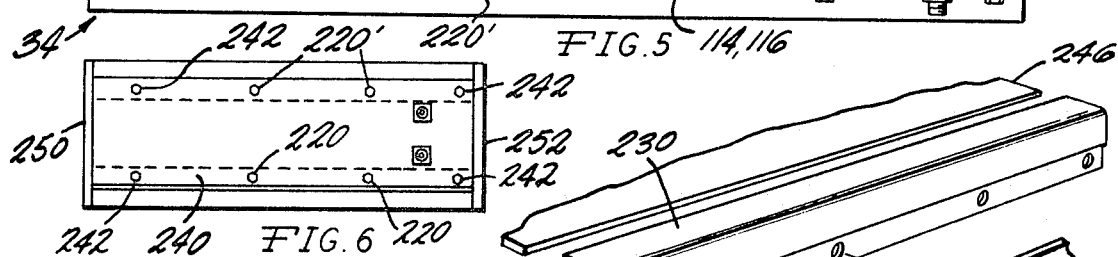
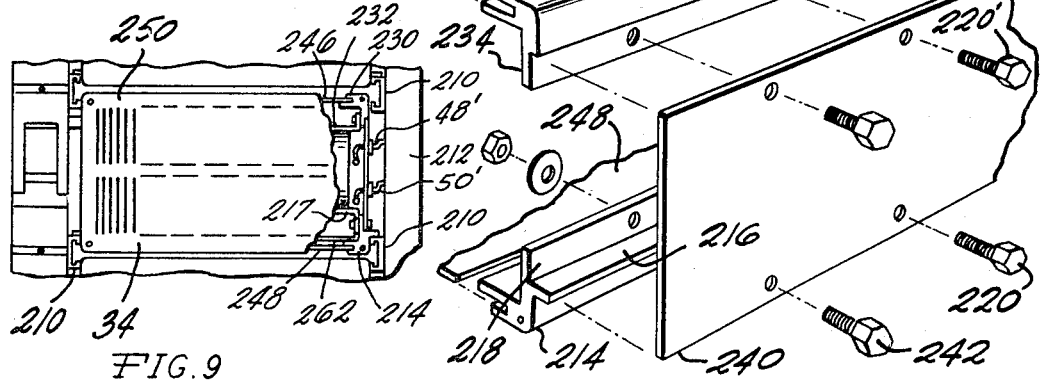
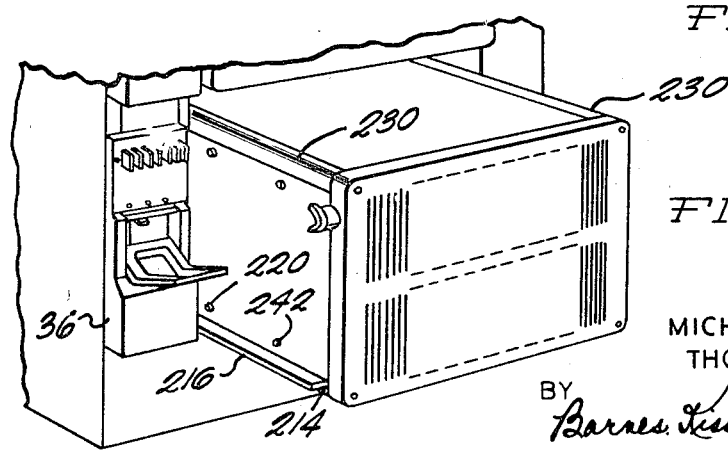
INVENTORS
MICHAEL A. KOLTUNIAK
THOMAS N. URQUHART
ATTORNEYS

MODULAR POWER SUPPLY WITH PLURAL RECTIFIER HOUSINGS BACK OF WHICH CONTAINS RECTIFYING DEVICES, A TRANSFORMER AND FAN MEANS

Among the objects of the present invention are to provide an alternating-to-direct current converter that provides reliability, flexibility, expandability and simplicity for different DC power requirements; that is constructed to simplify shipping, handling, installation and repair; that provides effective cooling while operating under widely varying ambient conditions and eliminating cooling air filtration for many applications; that is compact and lightweight by comparison to prior DC power supplies for the same kva rating; that effectively utilizes a plurality of individual rectifying units or modules in a wide variety of DC power applications; that provides an effective yet simple automatic voltage-current regulation for a plurality of individual modules without requiring individual control of each module; and that is capable of isolating the failure at an individual module while permitting continued operation of remaining modules to thereby prevent a total failure of the power supply.

Other objects, features and advantages of the present invention will become apparent in connection with the following description, the appended claims and the accompanying drawings in which:

FIG. 4 is a schematic circuit diagram showing the details of a voltage-current regulation circuit of FIGS. 2 and 3;

FIG. 5 is a top plan view of a single module used for high voltage applications;

FIG. 6 is a side view of the module illustrated in FIG. 5;

FIG. 7 is an exploded fragmentary view of one side of the module illustrated in FIG. 5;

FIG. 8 is a fragmentary perspective view illustrating a complete module and its associated circuit breaker; and FIG. 9 is an enlarged fragmentary view from FIG. 1 illustrating a single module and its associated circuit breaker.

Figure 1:
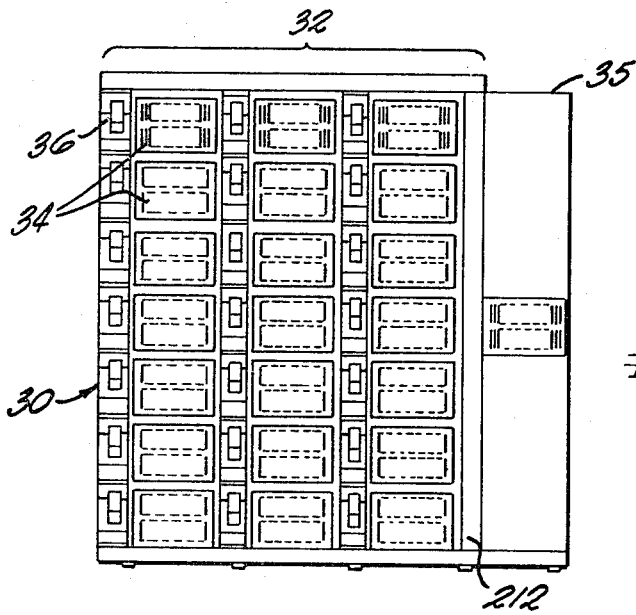
FIG. 1 is a front elevational view of an alternating-to-direct current converter having a modular construction according to the present invention consisting of 21 individual modules.
Figure 2:
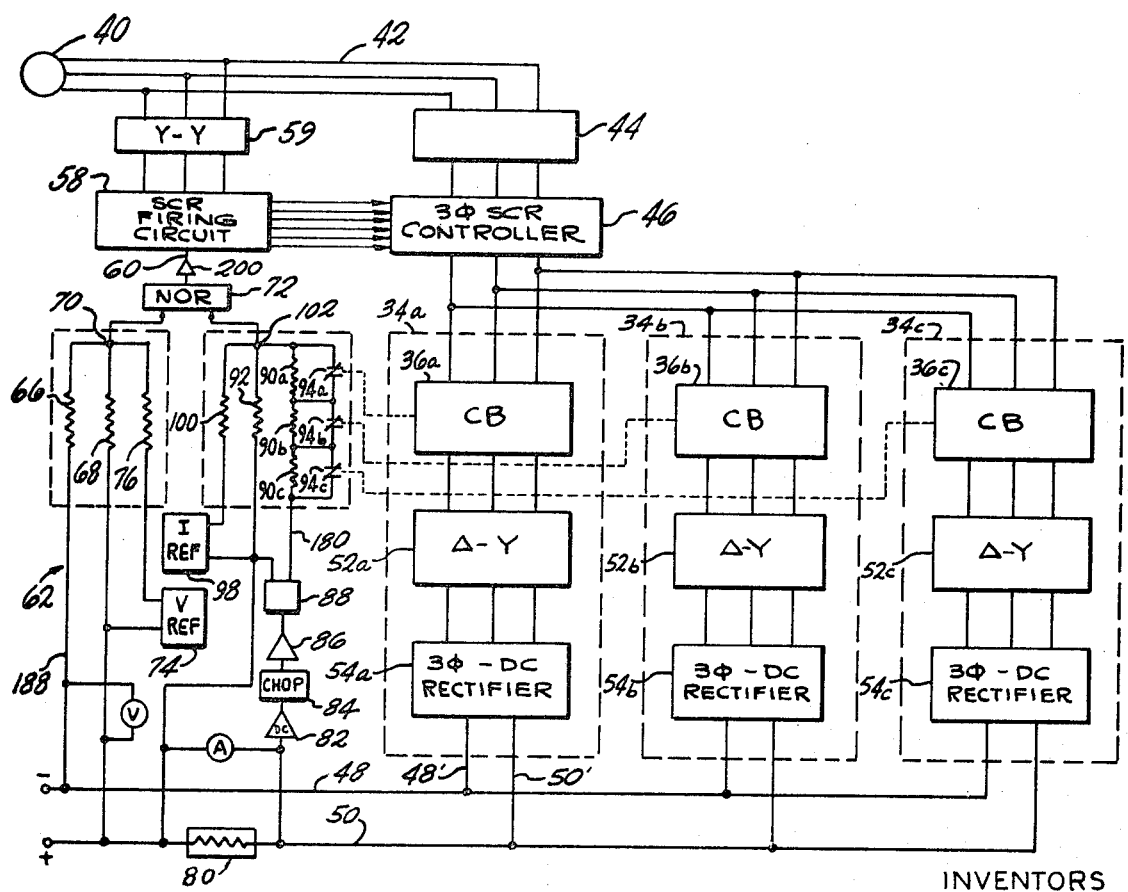
FIG. 2 is a functional block diagram for a modular power supply of the present invention and is illustrated for only three modules for purposes of simplicity.

Referring more particularly to FIG. 1, there is illustrated a modular power supply 30 of the present invention generally comprising a bank 32 of 21 individual rectifying modules 34 and a cabinet 35 which houses the controller circuits for the bank of modules. The 21 modules are arranged in three vertical columns, each column consisting of seven modules. Associated with each module is a separate circuit breaker 36. Each of the individual modules 34 is substantially identical, both in mechanical construction and electrical circuitry. Similarly, for purposes of understanding the present invention utilizing a plurality of modules, supplied from a common input bus and supplying a common output bus, it will be apparent that the operation and construction is basically the same regardless of the number of modules 34 utilized. Hence for purposes of illustration, the functional block diagram of FIG. 2 illustrates a simplified modular power supply incorporating only three modules, designated 34a, 34b and 34c. For purposes of clarity, the corresponding circuit breakers 36a, 36b, 36c are illustrated enclosed in the dashed line indicating an individual module, although it will be understood that the circuit breakers 36 are physically separated from other electrical components in the associated module 34 as will later be described in greater detail.

Referring more particularly to FIG. 2, a three-phase source 40 is connected by lines 42 through a main circuit breaker 44 to a three-phase SCR controller 46. The output of controller 46 is in turn fed via parallel paths through the respective modules 34a–c to the common DC output busses 48, 50. Each of the parallel paths through a respective module 34a, 34b, 34c is through the associated circuit breaker 36 and a delta-to-wye transformer 52 which feeds a three-phase diode rectifying circuit 54. The output from the three rectifying circuits 54 are connected in parallel to the output buses 48, 50.

Controller 46 is a full wave, duty cycle controller that receives six individual gating signals from an SCR firing circuit 58 which in turn is energized from the three-phase input lines 42. Firing circuit 58 has a control input at 60 that receives a DC feedback control signal from the voltage-current regulation circuit indicated generally at 62. The control signal at 60 controls the angular position of the various gating signals from circuit 58 relative to the phase angles of the positive and negative half cycles in each of the three phases at controller 46. Stated differently, the control signal 60 determines the duty cycle in each of the phases at controller 46 to thereby regulate the power supplies to the modules 34.

In general, the DC control signal at 60 is derived from either a voltage level at busses 48, 50 or the current level at busses 48, 50. More particularly, the voltage across busses 48, 50 is applied through a suitable isolating resistor 66 across a summing resistor 68 to develop the output signal at the summing terminal 70 that forms one input terminal of the "-NOR"-gate 72. A voltage reference from source 74 is also applied through an isolating resistor 76 across summing resistor 68 and in bucking relation to the feedback voltage through resistor 66 such that the output signal developed at the summing terminal 70 has a value indicating whether the reference is greater or less than the feedback from busses 48, 50 in addition to indicating the amount of deviation therebetween. Similarly, the output current in the positive bus 50 is sampled by the shunt 80 and the current feedback signal is fed through a DC amplifier 82, a chopper 84, an output driver amplifier 86 to a rectifier-filter circuit 88 that develops a DC signal representing the magnitude of the current in lines 48, 50. The signal developed by circuit 88 is applied through an isolating resistor 90 across a summing resistor 92. Equal portions 90a, 90b, 90c of resistor 90 are arranged to be shorted by respective contacts 94a, 94b, 94c. Contacts 94a, 94b, 94c are operated by the respective circuit breakers 36a, 36b, 36c so that when the circuit breakers are closed their corresponding contacts 94 are opened. As will later be explained in greater detail, should one of the circuit breakers open, for example, circuit breaker 36a, the corresponding contact 94a will be closed to short out resistor 90a and increase the feedback applied to the summing resistor 92 from the shunt 80. A current reference signal from source 98 is also applied across the summing resistor 92 through an isolating resistor 100 in bucking relation to the current feedback signal from circuit 88 so that the output developed at the summing terminal 102 has an amplitude that indicates which of the two signals exceeds the other as well as the amount of difference between the signals applied across resistor 92. The signal developed at the summing point 102 is applied to the other input of the "-NOR"-gate 72.

Figure 3:
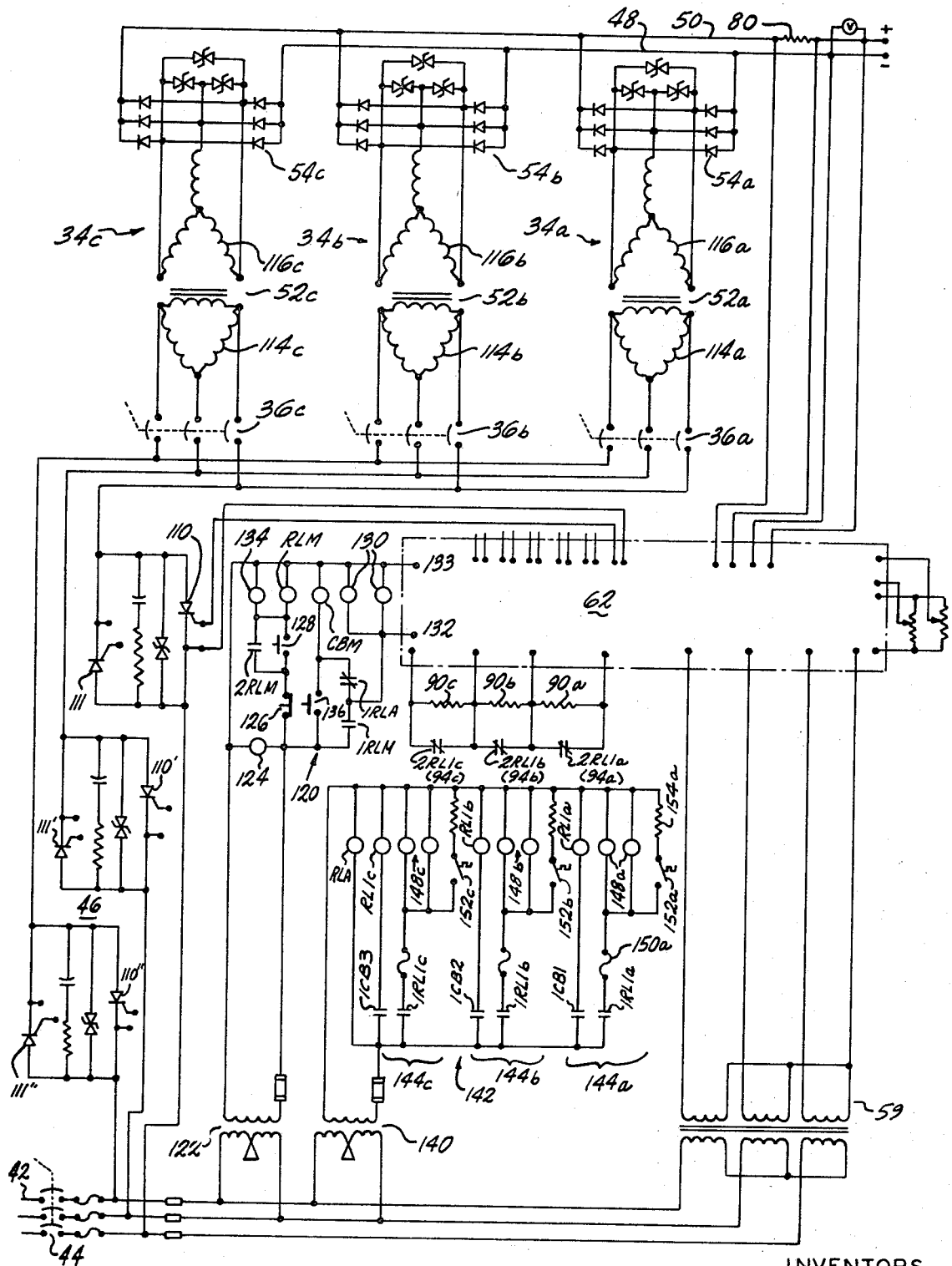
FIG. 3 is a schematic circuit diagram for the main controller-transformer-rectifying circuit paths of the power supply illustrated in FIG. 2.

The circuit details of the SCR controller 46, the modules 34, together with start-stop circuitry and the fan motor circuitry for cooling the modules 34 is shown in greater detail in FIG. 3 whereas the circuit details of the voltage-current regulating circuits 62 are shown in greater detail in FIG. 4. Referring more particularly to FIG. 3, the three-phase lines 42 are fed through the circuit breaker 44 to the SCR controller 46. Each of the three-phase lines is connected to the circuit breakers 36 through a pair of silicon controlled rectifiers 110, 111 for one of the lines, 110', 111' for a second of the lines and 110'', 111'' for the third line. Since the construction and operation of a three-phase, full wave duty cycle controller is known, per se, for purposes of simplicity only one of the SCR's 110 is shown with its gate circuit connected to the regulating circuit 62. It will be understood that in FIG. 3, the SCR firing circuit 58 (FIG. 2) has been omitted as a separate element and, for purposes of simplicity, included within the regulation circuit 62. Hence as will be apparent, in accordance with one important aspect of the present invention, the controller 46 is effective to simultaneously control the power applied through the respective circuit breakers 36a, 36b, 36c to the primary winding 114a-c of the three transformers 52a-c. It should be noted that transformers 52 have their primaries 114 connected in a delta and their secondaries 116 wye connected in the preferred embodiment. It has been found with the modular circuit being described, a delta-delta transformer and a wye-wye transformer do not operate as effectively for a given physical size due to poorer transformer efficiency. It has also been found that a wye-delta transformer creates phasing problems at the SCR controller 46. The secondaries 116 feed the rectifying circuits 54, each of which consists of six diode rectifiers connected in the three-phase, full wave bridge circuit illustrated.

The start-stop circuit 120 is fed from one phase of the three-phase input at lines 42 via a control transformer 122 which steps down the 480 volts across the single-phase input to 115 volts for the circuit 120. Connected across the secondary of transformer 122 is a pilot light 124. A control relay RLM is arranged to be connected across the secondary of transformer 122 through a normally closed stop switch 126 and a normally opened start switch 128. Relay RLM has two normally open contacts 1RLM and 2RLM. When start switch 128 is closed to energize relay RLM, the contacts 2RLM close to seal relay RLM and contacts 1RLM close to provide the power for the regulating circuit 62 which includes the SCR firing circuit 58 and for the fan motors 130 that cool the SCR's in the controller 46. For purpose of simplicity, in the present application, a control relay is designated by a letter designation and the contacts operated by that relay will be designated by the same letter designation preceded by a numeral designation. Substantially the same convention will be utilized for identifying solenoids and the contacts associated therewith. A separate pilot light 134 is connected across relay RLM to provide a separate indication that the power to the circuit 62 is on.

A solenoid CBM is also arranged to be connected across the secondary of transformer 122 by an emergency stop switch 136. Solenoid CBM is part of the circuit breaker 44 and is arranged to open the main circuit breaker 44 in response to closure of the emergency stop switch 136.

Two of the main lines 42 also feed a second stepdown control transformer 140 which is arranged to energize the circuit 142 that controls the motors for respective fans in each of the modules 34. Circuit 142 is also arranged to disconnect a module in response to excessive temperatures at the heat sink for the diode rectifiers 54. More particularly, a control relay RLA connected directly across the secondary of transformer 140 has a normally closed contact 1RLA in the circuit 120. When transformer 140 is energized to in turn energize relay RLA, contacts 1RLA open so that a time delayed closing of contacts 1RLM does not cause solenoid CBM to be energized. If, however, the power to circuit 142 is lost, as by a fuse blowing, relay RLA is deenergized and contacts 1RLA close to energize solenoid CBM through the contacts 1RLM that are closed in response to energization of relay RLM. This operates to open the main circuit breaker 44 to disconnect the entire power supply 30 from the lines 42. When the main circuit breaker 44 is opened by the solenoid CBM, either by operation of the emergency stop switch 136 or closure of contacts 1RLA and 1RLM, the power to the power supply 30 can be reconnected only by manual closure of the main circuit breaker 44.

The circuit 142 also includes fan energizing and temperature overload circuits 144a, 144b and 144c for the modules 34a, 34b, 34c, respectively. Since the circuits 144 are substantially identical, an understanding of the construction and operation of these circuits will be apparent from a description of one of the circuits 144a. The circuit 144a includes a control relay RL1a arranged to be connected across the secondary of transformer 140 through a normally opened contact 1CB1 that is mechanically linked with the contacts of the main circuit breaker 36a in the module 34a so that when the contacts in 36a are closed, the contacts 1CB1 are also closed to energize relay RL1a. Relay RL1a has a normally open contact 1RL1a and a normally closed contact 2RL1a (FIG. 3, designated by numeral 94a in FIG. 2). Closure of contact 1RL1a energizes two fan motors 148 (FIGS. 3 and 5) that are housed in the module package for the module 34a. Energization of motors 148 via contacts 1RL1a is through a current responsive element 150a that is physically incorporated in the circuit breaker 36a of the module 34a so that in response to excessive current through the element 150a the circuit breaker 36a is opened to disconnect the transformer 52a from the SCR controller 46. To this end, a normally open, temperature-responsive bimetal contact 152a is connected in series with a current limiting resistor 154a across the fan motors 148. Bimetal 152a is mounted directly on the heat sink for the diodes in the bridge rectifier 54a so that in response to excessive temperature at the diode the bimetal 152a closes to parallel resistor 154a with motors 148 causing the current through element 150a to increase to the point where it causes circuit breaker 36a to open. As previously indicated in connection with the description of FIG. 2, the contacts 2RL1a (FIG. 3, designated 94a in FIG. 2) are normally closed but in response to energization of relay RL1a contacts 2RL1a open so that resistor 90a is inserted in series with the current feedback from shunt 80 to decrease the feedback applied across the summing resistor 92. Similarly, should circuit breakers 36b or 36c open due to excessive current through the input to the respective primaries 114b, 114c, the corresponding contact 2RL1b or 2RL1c will close to short the corresponding resistor 90b or 90c to further increase the current feedback to the summing resistor 92. In this regard, it should be noted that each of the circuit breakers 36 includes at least two current responsive elements (not shown) each of which is connected in a different one of the input lines to the delta connected primary 114, i.e., in series with a respective line, so that the current sensing element opens the circuit breaker 36 in response to excessive current in any of the input phases to the transformer 52. Hence as indicated earlier, if the circuit breaker 36 is opened, either due to manual positioning of the circuit breaker or due to opening thereof in response to excessive current in the primary 114a, a corresponding resistor 90a will be shorted.

FIG. 3 also shows the specific construction of the wye-wye transformer 59 through which the SCR firing circuit 58 is energized. Transformer 59 is utilized to convert a three-wire input to a four-wire output with the fourth wire providing a false neutral in the SCR firing circuit 58. The use of the false neutral in the secondary of transformer 59 assures that all six SCR's 110, 111 in the controller 46 fire in the desired sequence independent of phase rotation of the three-phase source 40.

Referring now in greater detail to the circuit diagram for the voltage-current regulation circuit 62 illustrated in FIG. 4, the circuit 62 is energized by the input at lines 132, 133 (FIGS. 3 and 4) from the start-stop circuit 120 (FIG. 3). The alternating current input is rectified at 170 and the DC output from rectifier 170 is applied across a pair of potentiometers 172, 174 through a series regulator indicated generally at 176 to provide a stable reference voltage across the potentiometers 172, 174. Potentiometer 172 has a wiper 178 that serves as the current reference source (98, FIG. 2), with wiper 178 being connected through resistor 100 to the summing point 102. The summing point 102 is also connected through the serially connected resistors 90a, 90b, 90c and via the line 180 to the output of the rectifier-filter circuit 88. As was previously noted, the current feedback signal from shunt 80 (through amplifier 82, chopper 84, amplifier 86 and rectifier and filter circuit 88, FIG. 1) is applied in bucking relationship to the reference signal from wiper 178. Hence it will be apparent that for a positive increase in the DC output current across shunt 80, the feedback signal applied across summing resistor 92 increases in a negative direction. The output signal developed across resistor 92 is applied to one-half of the "-NOR" gate circuit 72 which generally comprises a two-stage buffer amplifier formed by transistors 182, 183, the output of which drives the base of the transistor 184.

Similarly, the potentiometer 174 has a wiper 185 that serves as the voltage reference source (74, FIG. 2) to supply the voltage reference through resistor 76 to the summing point 70. The summing point 70 is also connected through the resistor 66 and a suitable filter 186 to the negative bus 48 via lead 188. For purposes of simplicity, filter 186 is omitted from FIG. 2 and it will be understood that filter 186 merely smooths the ripples in the DC output developed across busses 48, 50 as well as serving as a voltage divider to set the level of the voltage feedback to the summing point 70. As indicated earlier, the voltage feedback signal via resistor 66 bucks the reference voltage from wiper 185 so that an increase in the voltage across busses 48, 50 results in a negatively increasing signal being applied to the summing point 70. The output developed across resistor 68 is applied to the "NOR"-gate 72 through a buffer amplifier formed by two transistors 192, 193, the output of which drives the base of transistor 194. Transistors 184, 194 have a common emitter-resistor 196 that develops a differential output signal in a manner to be described in greater detail. The output across resistor 196 is fed through an operational amplifier 200 to the control input 60 of the SCR firing circuit 58. As previously indicated, the SCR firing circuit 58 may be of generally conventional construction. In response to a variation in the level of the output signal developed at input 60, corresponding equal shifts in the firing angle of all six SCR's 110, 111 is achieved. In the preferred embodiment, the SCR firing circuit was a "Vectrol full wave phasetrol," Model No. VPH 1019–230/460–3X3, heretofore sold commercially by the Sprague Electric Company, North Adams, Massachusetts. Amplifier 200 is primarily to match the output signal developed across resistor 196 with the firing circuit 58 so that the firing angle of the SCR's 110, 111 can be varied over substantially a full 175° in response to the variations developed across output resistor 196.

The operation of the voltage-current regulation circuit 62 will be better understood assuming that there is initially no load on the six SCR's 110, 111 and that the voltage reference at wiper 185 is set to regulate the DC output voltage at busses 48, 50 to 12 volts. The reference voltage at wiper 185 is compared against the voltage feedback via line 188 which is initially zero at the summing point 70. Hence the positive reference causes the emitter-follower 192 to be forward biased and this drives transistor 194 into conduction. The transistor 194 is one-half of the "NOR"-gate 72 formed by transistors 184, 194. Transistor 194 develops an output signal across resistor 196 which is fed to amplifier 200 to in turn develop a DC control signal at 60 which drives the SCR firing circuit. The magnitude of the signal at 60 varies the effective width of the SCR gate pulses which, in turn, controls the SCR conduction angle. As the conduction angle of the six SCR's increases, the magnitude of the output voltage at 48, 50 will increase developing an increasing feedback voltage across the output 48, 50 and this in turn is fed back via resistor 66 and compared at resistor 68 against the voltage reference from 185. The voltage feedback is negative relative to the positive reference and hence when compared with the reference signal, the difference signal varies the base drive at transistor 194 to regulate the output at the constant 12 volts, regardless of line and load conditions. Regulation in a constant voltage mode continues until the amplified current feedback signal becomes large enough to turn transistor 184 on. In the absence of a load current or until the load current reaches a maximum value as determined by the setting of the current reference wiper 178, the base of transistor 184 is reverse biased and transistor 184 remains off. As a result, only voltage control is exercised by transistor 194. However, when the output current at busses 48, 50 has reached a value which is sufficiently large that the feedback from shunt 80 when compared with the current reference signal at wiper 178 turns transistor 184 on, conduction at transistor 184 turns transistor 194 off via the common emitter resistor 196 and crossover from voltage control to current control occurs. Further increases in output current result in a greater negative feedback that interacts with the current reference signal at resistor 92 so that constant current is maintained. During constant current control, the voltage is free to fall. Stated differently, when crossover from constant voltage control to constant current control occurs, the SCR's are phased back to a shorter duration conduction angle so that current through the load remains constant, even though more current is demanded. By the same token, when the device is in the constant voltage mode as opposed to constant current, if the load were constant and the line or the load were to change such that the voltage tried to increase, the voltage would be decreased.

As previously indicated, the current feedback is effected through resistors 90*a*, 90*b*, 90*c*, each of which is tied in with its respective module 34*a*, 34*b*, 34*c*; that is, the resistors 90*a*, 90*b*, 90*c* are arranged to be shorted by respective contacts 2RL1*a*, 2RL1*b*, 2RL1*c* so that the feedback level is inversely proportional to the number of operative modules. By way of further illustration, for a 21-module system, there will be 21 resistors in series with the current feedback and each resistor is shorted by a normally closed relay contact. When each module is energized by closing its associated circuit breaker 36, this, in turn, opens a normally closed relay contact 94, thereby inserting a resistor. As a result, the number of resistors that are active in the current feedback network represent the number of modules that are in operation. In the event that a module 34 becomes inoperative as a result of a failure mode or manual disconnect, this in turn reactivates a relay contact 94 to short out the resistor 90 that represents that module in the current feedback network. As a result, the current feedback signal is increased, thereby setting the automatic control to the point at which the full load current must be limited in order not to exceed the capability of the remaining modules active in the system. This system has particular merit in a system capable of $n$ modules 34 but where only $2n/3$ modules 34 are installed in the system, which leaves $n/3$ modules that are not operable at that time. The circuit breakers 36 for the associated $n/3$ modules are left open. Using a normally closed relay contact to shunt a resistor prevents exceeding the current capability of the remaining $2n/3$ modules that are in the system. When other of the $n/3$ modules are added and activated by closing their circuit breakers, the contacts corresponding to contacts 94 are opened, thereby altering the current feedback signal and allowing the system to deliver the full current capability as reflected by the increased number of modules. The level of the current feedback will determine the maximum current output at busses 48, 50, even though the wiper 178 is set for a greater current than the active modules are capable of producing.

The mechanical construction of the power supply 30 together with the construction of the individual modules 34 is better illustrated in FIGS. 5–9 wherein a plurality of horizontally disposed U-shaped channels 210 are mounted on vertical uprights 212. Each of the modules 34 has a pair of bottom corner extrusions 214 having laterally outwardly projecting integral flanges 216 slideable on the top face of an associated channel 210. The flanges 216 and channels 210 extend the full length of the modules 34. Each of the bottom corner extrusions 214 are mounted on opposite ends of a pair of lower transformer brackets 217. Each bracket 217 has a downturned flange on its outer end that is fastened on an upstanding leg 218 of the corner 214 by one of the screws 220. Similarly, upper corner extrusions 230 are mounted on opposite ends of a pair of upper transformer brackets 232 by means of the upturned flanges on the ends of brackets that are fastened on downwardly depending legs 234 of the upper corner extrusions 230 by screws 220'. The laminations of the core 238 of the transformer 52 are securely bolted together between the upper transformer brackets 232 and the lower transformer brackets 217. The transformer primary winding 114 and secondary winding 116 are wound on core 238 in a generally conventional manner. Hence the transformer and its mounting brackets 217, 232 rigidly support the corner extrusions 214, 230, the lower corner extrusions 214 in turn providing a slideable mount on the channel 210 so that the modules 34 can slide outwardly from the frame members 212. The sides of the module 34 are each closed by a vertical side panel 240 which is fastened on the integral legs 218, 234 of the bottom and top corners 214, 230, respectively, by the four transformer mounting screws 220, 220' and four additional screws 242. A flat top panel 246 is removably carried in grooves on the upper corner extrusion 230 whereas a lower bottom panel 248 is removably carried in grooves on the bottom corner extrusions 214. Front and rear grills 250, 252, respectively, are mounted on opposite ends of the module 34 by screws threaded in the corner extrusions. The mounting screws 242 at the rear end of the modules 34, the right side as viewed in FIGS. 5 and 6, also support a fan bracket 254 that carries the two fan motors 148 (FIGS. 3 and 5) for each of the modules 34.

The six diode rectifiers and the rectifying circuit 54 are mounted on a suitable heat sink 260 which in turn is mounted on a heat sink bracket 262. Bracket 262 extends transversely of the module 34 and is fastened at opposite lateral sides thereof to the bottom corner 214 by the lower front screws 242. The positive bus 48' and the negative bus 50' connect the output of the rectifying circuit 54 to the main bus lines 48, 50 with the busses 48', 50' extending from the rectifying circuit 54 rearwardly through the module 34 and outwardly through one of the side panels 240 to suitable connectors at the rear of the modules where it is paralleled with the output from the other modules 34.

The particular construction of a single module described hereinabove has several important advantages. For purposes of illustration, the module 34 described in connection with FIG. 5 is for a high voltage rectifier system utilizing the heat sink construction 260 illustrated in FIG. 5. Similarly, the output in a high voltage rectifying system may be by conventional high tension bus leads 48', 50'. However, when the modular power supply 30 is constructed for low voltage systems, many of the same structural components can be used, namely, the corner extrusions 214, 230, the same top panel 246, the same bottom panel 248, the front and rear grills 250, 252 and the fan bracket 254 and fan motors 148. In general, the principal difference then between a high voltage and low voltage module merely involves a different mounting arrangement for a low voltage, high current heat sink and a slightly different transformer that is slightly larger but generally on the same order of dimensions as the transformer illustrated in FIG. 5 for the high voltage system. In the preferred embodiment of a low voltage system, the side panels 240 are modified so that the side panel serves not only as a structural component but also as a low voltage bus bar and, to some extent, serves to further conduct heat away from the low voltage heat sink.

It is also important that the various parts of each module are, to some extent, interchangeable. Hence the two bottom corners 214 have identical transverse cross sections and can be cut from the same extrusion. Similarly, the two upper corners 230 have identical transverse cross sections and are cut from the same extrusion. The top and bottom panels 246, 248 are identical and the four transformer brackets 217, 232 are identical. Although the front grill 250 is preferably of a different construction than the rear grill 252, the front grill on a high voltage power supply is interchangeable with the front grill on a low voltage power supply. Additionally, the modules 34 for either a high voltage application or a low voltage application have the same outside dimensions.

As noted hereinabove, the transformer brackets 232, 217 extend transversely substantially the full width of the module 34 and provide a main structural component giving rigidity to the module. Hence in the preferred embodiment, the transformer brackets 232, 217 are made of heavy gauge steel whereas the corners 214, 230 are extruded aluminum and the top, bottom and side panels are aluminum sheet metal. The grills 250, 252 are molded plastic. Hence the majority of the weight of an individual module is in the core 238 and the windings 114, 116. At least as important is the fact that each individual module 34 can be removed from the power supply 30 so that the modules can be handled, transported and installed individually to complete the assembly on site. This has numerous advantages over a bulky, heavy power supply providing the same kva output and contained in a single package. By way of example, a 24-volt module weighs approximately 234 pounds and a frame for 21 modules weighs approximately 2,500 pounds, whereas for a high voltage system at 300 volts utilizes modules each weighing 225 pounds with a 21-module frame weighing approximately 2,450 pounds.

The control circuitry described in connection with FIGS. 1–4 achieves effective control of plural modules made under close production tolerances to provide mechanical and electrical uniformity as between different modules. Similarly, the construction described hereinabove can provide mechanical and electrical symmetry in the different phases of an individual module. In this regard, the reactance of the transformer 52 is the most single important factor in determining how the current is shared as between parallel modules as well as between diodes within the rectifying circuit 54 of a given module. Hence variations due to differences between diodes and the rectifying circuits 54 are of secondary importance as compared to the transformer 52.

The horizontal airflow pattern through each of the individual modules also offers several distinct advantages, including a relatively large inlet at the front grill 250 for each individual module as well as a large combined total area for all of the modules when assembled in a bank such as the 21-module bank shown in FIG. 1. The cooling air is drawn by the fans located at the rear of the module so that the cool air first cools the heat sinks, such as the heat sink 260, and then the transformers before being exhausted at the rear of the module to grill 252. Again each of the individual grills on a single module offers a relatively large exhaust area as well as a combined exhaust area for the plurality of modules assembled in a bank. The flow from front to rear, as contrasted to vertical flow means that the cooling air is likely to be cleaner as contrasted to a system having an inlet at only a low level adjacent the floor. With a rear exhaust, it is not necessary to have a substantial clearance at the top of the power supply 30. Also with the large inlet and outlet areas for the cooling air, large quantities of air can be moved at a relatively low velocity, producing a much quieter operating system by comparison to prior art devices.

Important advantages of the modular power supply described hereinabove are that a complete power supply can be built up from inventory modules to meet practically any power requirement by using the proper number of modules. A customer anticipating large future power requirements need not purchase the entire power supply to service those future requirements but by buying a large cabinet and using less than the maximum number of modules, the customer can meet present power requirements and then add additional modules as his demands increase. The system is very reliable in that extra modules may be kept on hand by the customer to eliminate down time in the event of a failure at one of the modules. The defective module is merely left in place and its circuit breaker opened while the circuit breaker on the spare module is closed. A self-adjusting voltage and current control with current limits override according to the number of modules in operation, and indeed the particular modules that are active, facilitate this flexibility and reliability of the modular power supply.

By way of further disclosure, the total capacity of the modular power supply 30 of the type described hereinabove is determined primarily by the ratings of the SCR's 110, 111 in the SCR controller. The ratings on air cooled SCR's presently available commercially are such that, in the preferred embodiment, the total kw. output from the power supply 30 is on the order of 500 kw. After extensive development, it has been found that the above total kw. output can be achieved while maintaining adequate safety ranges. Moreover, it has been found by extensive development that the above maximum output capabilities can be achieved most effectively by using 28 separate modules 34, for example, four vertical columns of seven modules per column. This particular arrangement provides a very compact power supply having a large ultimate power capability.

We claim:

1. An alternating to direct-current converter for large power applications comprising a plurality of individual rectifying units connected together to be responsive to a common source of alternating voltage and to develop a common direct current output, power control means operatively coupled between said source and said plurality of rectifying units, each of said rectifying units comprising at least a respective transformer having a primary winding and a secondary winding, a respective rectifying circuit coupled in the output of said secondary winding and a respective circuit breaker means operatively coupled in circuit with said transformer means to selectively connect and disconnect its associated transformer to said power control means, and wherein each of said rectifying units further comprises a respective housing extending longitudinally in a generally horizontal direction and being constructed to define a confined path for airflow through said housing in a horizontal direction, an inlet at one end of said housing, an outlet at the other end of said housing and fan means mounted in each housing and adapted to establish a moving current of air through said housing along said path, a respective transformer and rectifying circuit being mounted in each housing so as to be disposed in said moving current of air.

2. An alternating to direct current converter for large power applications comprising a frame adapted to accommodate and support a plurality of substantially identical rectifying units, a plurality of rectifying units mounted in and supported by said frame, said rectifying units being electrically connected together to be responsive to a common source of alternating voltage and to develop a common direct current output, power control means operatively coupled between said source and said rectifying units, regulator means responsive to said common output and operatively coupled to said power control means to vary the power from said source to said rectifying units in accordance with variations in said common output, and a plurality of circuit breaker means each of which is operatively coupled between said power control means and a respective rectifying unit for selectively connecting and disconnecting its respective unit to and from said power control means, and wherein each of said rectifying units further comprises a modular housing having wall means defining a substantially confined path through said housing for cooling air, a cooling air inlet at one end of said housing, an outlet at the other end of said housing, fan means mounted in said housing and adapted to establish a current of moving air through said housing from the inlet thereof to the outlet thereof, a respective transformer mounted in each housing so as to be disposed in said path of cooling air therethrough and having a primary winding and a secondary winding, said primary winding being adapted to be electrically coupled to said power control means through a respective circuit breaker means, and a respective rectifying circuit mounted in said housing so as to be disposed in said path of cooling air therethrough and being electrically coupled between said secondary winding and said common output.

3. The converter set forth in claim 2 wherein said common source is a three-phase source and said power control means comprises at least three pairs of rectifiers, at least one of said rectifiers in each of said pairs being a controlled rectifier having a control electrode operatively coupled to said regulator means to vary the power from said source in accordance with variations in said common output.

4. The converter set forth in claim 2 wherein said frame has a plurality of openings extending horizontally through said frame from the front of said frame to the rear of said frame and wherein each modular housing is removably mounted in a respective opening of said frame.

5. The converter set forth in claim 4 wherein said frame openings are generally rectangular, each housing extends longitudinally in a horizontal direction through said frame and has a transverse vertical cross section that is generally rectangular, each housing has a substantially closed top wall, a substantially closed bottom wall and substantially closed sidewalls, said top, bottom and sidewalls defining said path for cooling air through said modules, an inlet grill at a front end of each housing and an outlet grill at the rear end of each housing so that said path for cooling air is a substantially direct horizontal path from said inlet grill through said housing, over said transformer and said rectifying circuits, to said outlet grill.

6. The converter set forth in claim 4 wherein each circuit breaker means is mounted on said frame directly adjacent a respective opening in which an associated modular housing is supported.

7. The converter set forth in claim 4 wherein a first plurality of openings in said frame are arranged in a first vertical column, a second plurality of openings in said frame are arranged in a second vertical column with each opening in said second column in horizontal, side-by-side alignment with a respective opening in said second column, a first plurality of said modular housings supported in said frame openings in said first column and a second plurality of said modular housings supported in said frame openings in said second column.

8. The converter set forth in claim 2 wherein said rectifying circuits are mounted adjacent said inlet of their respective housings, said fan means are mounted adjacent said outlets of their respective housings, and said transformers are mounted in their respective housings between said fan means and said rectifying means.

9. The converter set forth in claim 1 wherein said rectifying circuits are mounted adjacent said inlet of their respective housings, said fan means are mounted adjacent said outlets of their respective housings, and said transformers are mounted in their respective housings between said fan means and said rectifying means.

10. A modular rectifying unit for use in an alternating-to-direct current converter having a plurality of such units, said rectifying unit comprising a housing having a substantially closed top wall, a substantially closed bottom wall and substantially closed sidewalls, an air inlet at one end of said housing, an air outlet at the other end of said housing, said walls extending longitudinally of said housing and defining a direct, generally straight line path from said inlet to said outlet for cooling air circulating through said housing, fan means mounted in said housing adjacent said outlet and adapted to establish a current of moving air along said path through said housing, rectifying devices mounted in said housing adjacent said inlet so as to be disposed in said cooling airpath and a transformer mounted in said housing longitudinally thereof between said rectifying devices and said fan means, said transformer having a secondary winding electrically connected to said rectifying devices.

* * * * *

PO-1050
(5/69)

UNITED STATES PATENT OFFICE
CERTIFICATE OF CORRECTION

Patent No. 3,641,419           Dated February 8, 1972

Inventor(s) MICHAEL A. KOLTUNIAK and THOMAS N. URQUHART

It is certified that error appears in the above-identified patent and that said Letters Patent are hereby corrected as shown below:

In the Title [two occurrences: (1) on information cover page; (2) at the beginning of Column 1], delete "BACK" and insert in place thereof --EACH--.

In Column 8, line 46, before "advantages" delete "Important" and insert in place thereof --Other important--.

Signed and sealed this 18th day of July 1972.

(SEAL)
Attest:

EDWARD M.FLETCHER,JR.            ROBERT GOTTSCHALK
Attesting Officer                Commissioner of Patents